United States Patent
Ran et al.

(10) Patent No.: US 11,369,844 B2
(45) Date of Patent: Jun. 28, 2022

(54) MACHINE LEARNING AUGMENTED LOOP DRIVE TRAINING

(71) Applicant: International Business Machines Corporation, Armonk, NY (US)

(72) Inventors: Chuan Ran, Morrisville, NC (US); Junhui Wang, Cary, NC (US); Guandong Zhu, Raleigh, NC (US); Yongchang Cui, Cary, NC (US); Shuyan Lu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 17/038,535

(22) Filed: Sep. 30, 2020

(65) Prior Publication Data

US 2022/0096899 A1     Mar. 31, 2022

(51) Int. Cl.
| | |
|---|---|
| *A63B 24/00* | (2006.01) |
| *G06N 20/00* | (2019.01) |
| *A63B 71/06* | (2006.01) |
| *A63B 102/16* | (2015.01) |

(52) U.S. Cl.
CPC ...... *A63B 24/0075* (2013.01); *A63B 71/0622* (2013.01); *G06N 20/00* (2019.01); *A63B 2024/0009* (2013.01); *A63B 2024/0034* (2013.01); *A63B 2071/063* (2013.01); *A63B 2071/0694* (2013.01); *A63B 2102/16* (2015.10); *A63B 2208/0204* (2013.01);
(Continued)

(58) Field of Classification Search
CPC .................................. A63B 24/0075
See application file for complete search history.

(56) References Cited

U.S. PATENT DOCUMENTS

| | | |
|---|---|---|
| 6,126,449 A | 10/2000 | Burns |
| 8,025,560 B2 | 9/2011 | Ikejiri |
| 8,251,789 B2 | 8/2012 | Ikejiri |
| (Continued) | | |

FOREIGN PATENT DOCUMENTS

| | | |
|---|---|---|
| CN | 101964047 A | 2/2011 |
| CN | 203458774 U | 3/2014 |
| (Continued) | | |

OTHER PUBLICATIONS

"A type of visual anthropomorphic table tennis ball machine", An IP.com Prior Art Database Technical Disclosure, Disclosed Anonymously, IP.com No. IPCOM000254409D, IP.com Electronic Publication Date: Jun. 26, 2018, 4 pages.
(Continued)

*Primary Examiner* — Kesha Frisby
(74) *Attorney, Agent, or Firm* — David B. Woycechowsky

(57) ABSTRACT

Disclosed are techniques for leveraging machine learning to generate posture adjustment values for specific body postures of a player to improve loop drive techniques, such as in table tennis. Video clips of a player hitting a ball with a loop drive technique are analyzed to determine values for specific body postures and qualities of the ball after being hit. A machine learning model is generated to analyze relationships between body posture values and ball qualities. Upon receiving a video clip of a live session of a player hitting a ball using a loop drive technique, the machine learning model is used to generate adjustment values for body postures of the player to impart improved loop drive qualities to the ball, such as faster topspin.

18 Claims, 5 Drawing Sheets

(52) U.S. Cl.
CPC ..... *A63B 2220/05* (2013.01); *A63B 2220/806* (2013.01); *A63B 2230/62* (2013.01)

(56) References Cited

U.S. PATENT DOCUMENTS

| | | |
|---|---|---|
| 10,112,076 B2 | 10/2018 | Decarlo |
| 10,668,353 B2 | 6/2020 | Mettler May |
| 2005/0153785 A1 | 7/2005 | Sun |
| 2014/0266630 A1 | 9/2014 | Beckman |
| 2015/0100245 A1 | 4/2015 | Huang |
| 2016/0144260 A1 | 5/2016 | Cohen |
| 2016/0322078 A1 | 11/2016 | Bose |
| 2017/0318360 A1 | 11/2017 | Tran |
| 2019/0009133 A1 | 1/2019 | Mettler May |
| 2020/0184846 A1 | 6/2020 | Zhang |

FOREIGN PATENT DOCUMENTS

| | | |
|---|---|---|
| CN | 104486591 A | 4/2015 |
| CN | 106621261 A | 5/2017 |
| CN | 110227243 A | 9/2019 |
| WO | 2019202474 A1 | 10/2019 |

OTHER PUBLICATIONS

"An optimized IT subsystem health scoring method through combination of Time series model and traditional Machine Learning model", An IP.com Prior Art Database Technical Disclosure, Disclosed Anonymously, IP.com No. IPCOM000260282D, IP.com Electronic Publication Date: Nov. 9, 2019, 6 pages.

"Cognitive learning assistance", An IP.com Prior Art Database Technical Disclosure, Disclosed Anonymously, IP.com No. IPCOM000256388D, IP.com Electronic Publication Date: Nov. 28, 2018, 9 pages.

"Reinforcement Learning as a Basis for Optimization of Operating Systems", An IP.com Prior Art Database Technical Disclosure, Disclosed Anonymously, IP.com No. IPCOM000256512D, IP.com Electronic Publication Date: Dec. 5, 2018, 9 pages.

"Sports Ball Degradation Time Computation Using Audio-Visual Analysis", An IP.com Prior Art Database Technical Disclosure, Disclosed Anonymously, IP.com No. IPCOM000262451D, IP.com Electronic Publication Date: Jun. 2, 2020, 5 pages.

Blank, et al., "Ball Speed and Spin Estimation in Table Tennis using a Racket-mounted Inertial Sensor", ISWC '17, Sep. 11-15, 2017, 8 pages.

Gu, et al., "Effects of table tennis multi-ball training on dynamic posture control", PeerJ 6:e6262, Jan. 16, 2019, 19 pages, <https://peerj.com/articles/6262/>.

Mahjourian, et al., "Hierarchical Policy Design for Sample-Efficient Learning of Robot Table Tennis Through Self-Play", arXiv:1811.12927v2, Feb. 17, 2019, 100 pages.

Vinyes Mora, Silvia, "Computer Vision and Machine Learning for In-Play Tennis Analysis: Framework, Algorithms and Implementation", Doctoral Thesis, Imperial College London, Oct. 2017, 235 pages.

Xie, et al., "Speed and Spin of 40MM Table Tennis Ball and the Effects on Elite Players", ISBS 2002, pp. 623-626.

Ran, et al., "Capturing and Quantifying Body Postures", U.S. Appl. No. 17/038,568, filed Sep. 30, 2020.

Ran, et al., "Capturing and Quantifying Loop Drive Ball Metrics", U.S. Appl. No. 17/038,594, filed Sep. 30, 2020.

List of IBM Patents or Patent Applications Treated as Related. Filed Herewith. 2 pages.

MACHINE LEARNING AUGMENTED LOOP DRIVE TRAINING

BACKGROUND

The present invention relates generally to the field of machine learning, and more particularly loop drive training using machine learning techniques, such as in table tennis.

Machine learning (ML) is the study of computer algorithms which automatically improve through experience. It is typically viewed as a subset of artificial intelligence (AI). Machine learning algorithms typically construct a mathematical model based on sample data, sometimes known as "training data", in order to determine predictions or decisions without being specifically programmed to do so.

Computer vision is an interdisciplinary field which grapples with how computers can be granted the ability to gain high-level understanding from digital images or videos. From an engineering perspective, it seeks to automate tasks that the human visual system can do. Computer vision related to the automatic extraction, analysis and understanding of useful information from a single image or a sequence of images such as an animation or video feed. It involves developing a theoretical and algorithmic basis to achieve automatic visual understanding.

Table tennis, also known as ping-pong and whiff-whaff, is a sport where two or four players hit a lightweight ball, also known as the ping-pong ball, back and forth across a table using small rackets, with one to two players on opposing teams positioned on each side of the table. The game takes place on a hard table surface divided by a net. With an exception for the initial serve, the rules are generally as follows: players must allow a ball played toward them to bounce at least once on their side of the table and must return it so that it bounces on the opposite side at least one time. Points are scored when a player fails to return the ball within the rules. Play is fast and requires quick reactions from the players. Spinning the ball alters the trajectory of the ball and limits an opponent's options, giving the player hitting the ball a great advantage, with topspin and downspin corresponding to forward and backward rotation of the table tennis ball relative to the direction of travel for the table tennis ball. Topspin and downspin alter the trajectory of the ball through a phenomenon known as the Magnus effect. The Magnus effect describes a phenomenon where an object travelling through a volume of gas or fluid is deflected in a manner not present when the object is not spinning, and is explained by the difference in pressure of the volume on opposite sides of the spinning object, with rotational speed of the object affecting the extent of the Magnus effect. The "loop", or "loop drive" is a stroke that generates a lot of topspin (with either the forehand or backhand). Loop varieties include slower, 'spinnier' loops and faster but 'not-as-spinny' loops. The loop style is the most popular playing style in contemporary table tennis with a strategy heavily reliant on the loop drive stroke.

SUMMARY

According to an aspect of the present invention, there is a method, computer program product and/or system that performs the following operations (not necessarily in the following order): (i) receiving a plurality of historical loop drive session data sets, where a loop drive session data set includes at least a player posture data set and a corresponding ball return quality data set, a player posture data set includes a plurality of posture data points, and a ball return quality data set includes a plurality of ball return quality metrics; (ii) generating a table tennis training machine learning model based, at least in part, on the plurality of loop drive session data sets; (iii) receiving a live loop drive session data set corresponding to a loop drive session of a live table tennis player; and (iv) assigning labels to the plurality of posture data points of the player posture data set of the live loop drive session data set based, at least in part, on the table tennis training machine learning model and the ball return quality data set of the live loop drive session data set.

DETAILED DESCRIPTION

Figure 1:
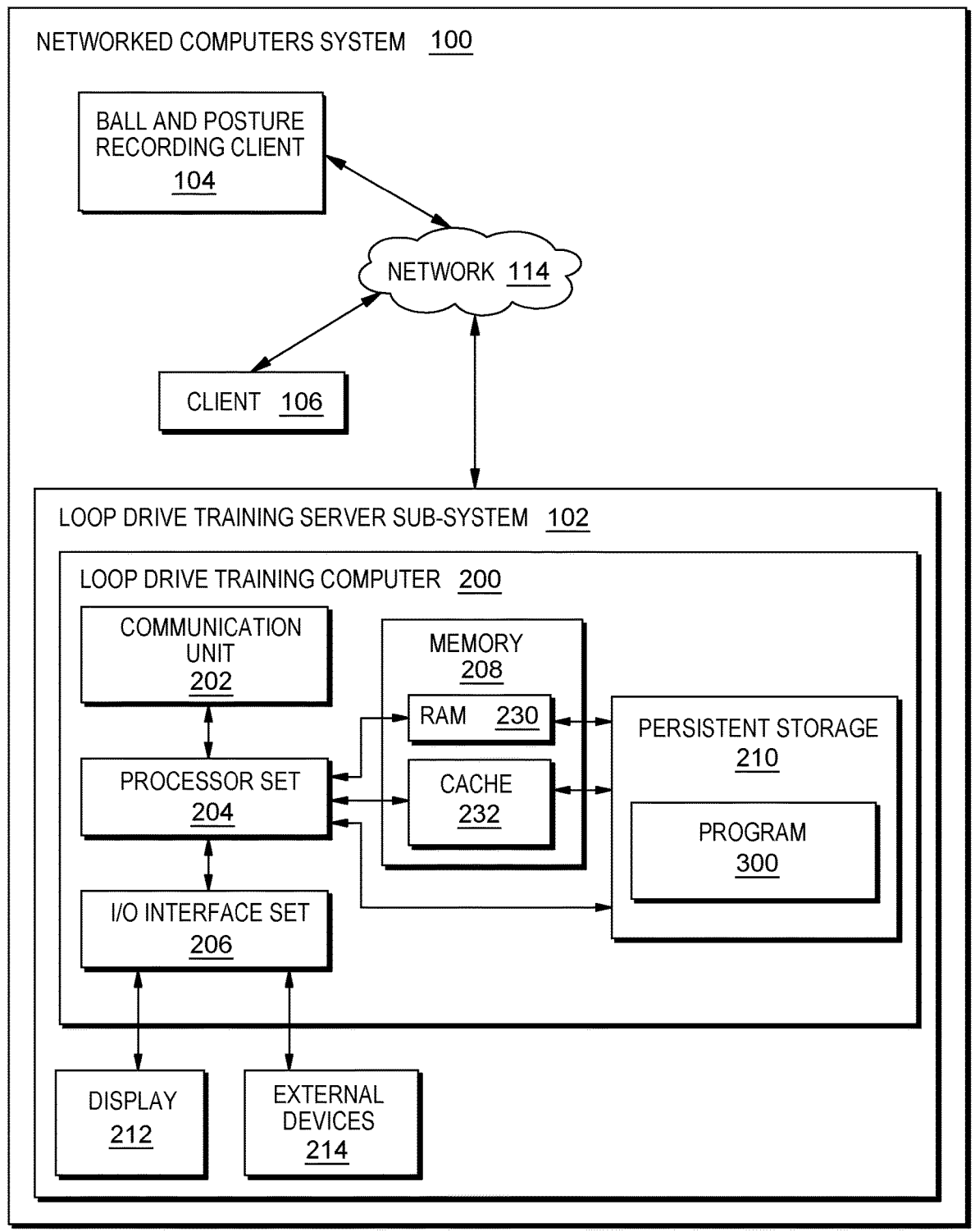
FIG. 1 is a block diagram view of a first embodiment of a system according to the present invention.

Some embodiments of the present invention are directed to techniques for leveraging machine learning to generate posture adjustment values for specific body postures of a player to improve loop drive techniques, such as in table tennis. Video clips of a player hitting a ball with a loop drive technique are analyzed to determine values for specific body postures and qualities of the ball after being hit. A machine learning model is generated to analyze relationships between body posture values and ball qualities. Upon receiving a video clip of a live session of a player hitting a ball using a loop drive technique, the machine learning model is used to generate adjustment values for body postures of the player to impart improved loop drive qualities to the ball, such as faster topspin.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium, also known as machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202;

processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
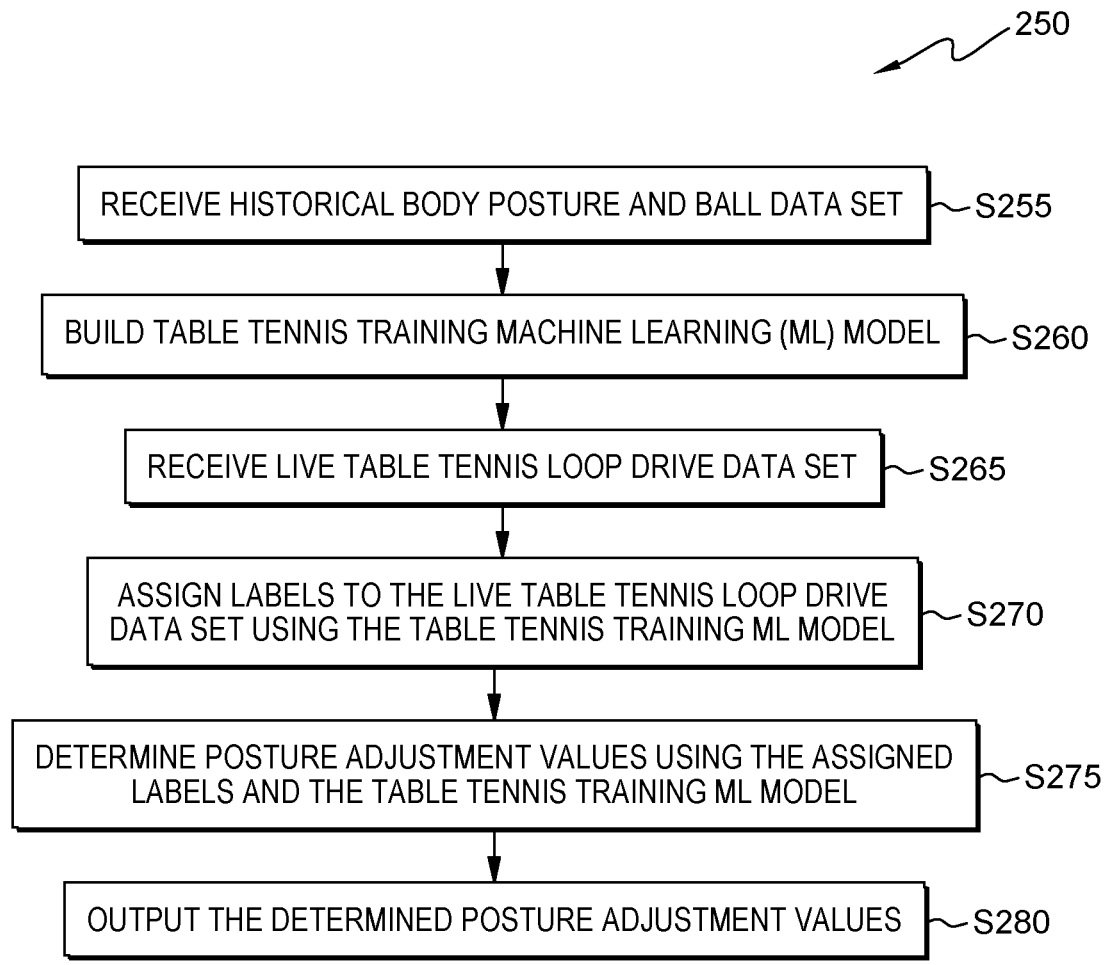
FIG. 2 is a flowchart showing a first embodiment method performed, at least in part, by the first embodiment system.
Figure 3:
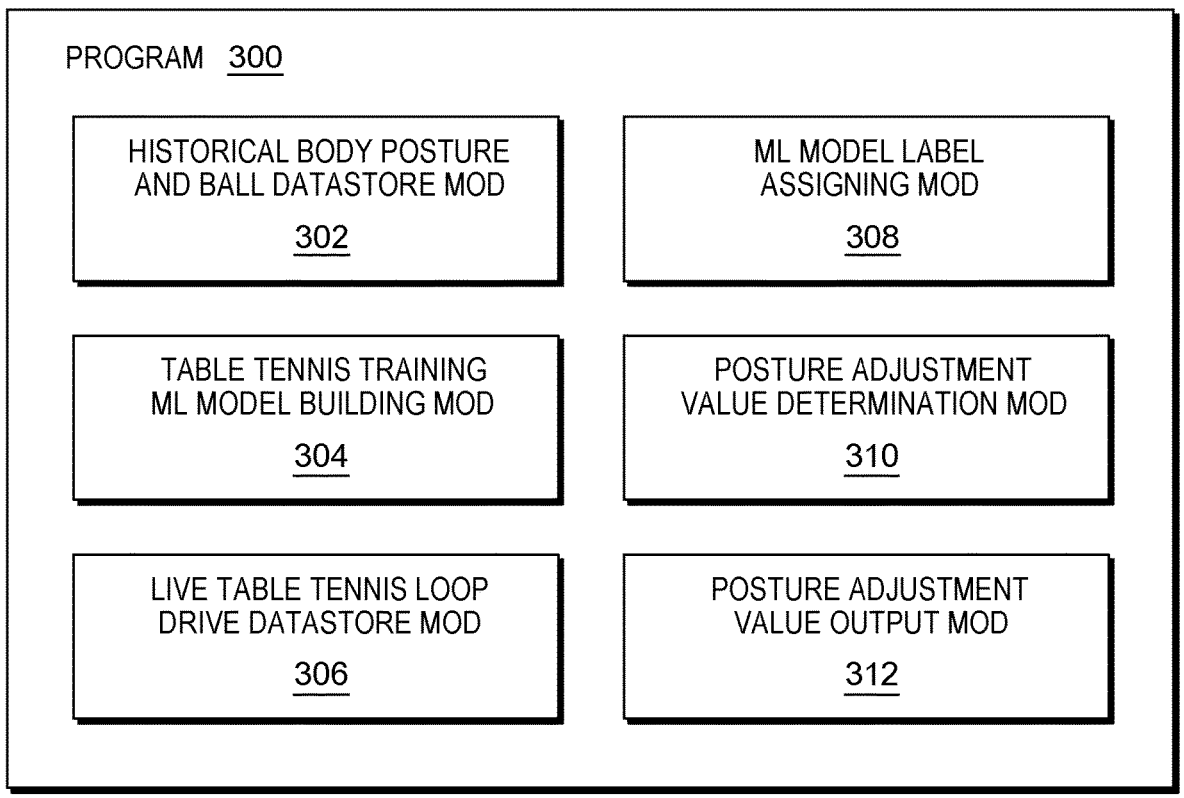
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where historical body posture and ball datastore module ("mod") 302 receives a historical body posture and ball data set. In this simplified embodiment, the historical body posture and ball data set includes ten historical loop drive instances, where each historical loop drive instance includes a posture data set and a ball return quality data set from one loop drive return, concerning a period of time (also referred to as the period of time) beginning from the moment a table tennis ball (also referred to as the ball) begins travelling towards a table tennis player practicing loop drive (also referred to as the player), through the player striking the ball with their table tennis racket (also referred to as the racket), until after the ball contacts a table tennis table (also called the table) a second time after the player strikes the ball with their racket, or contacts a table tennis racket surface of an opposing table tennis player, or contacts any other surface. These data sets are originated from computer vision technologies applied to video feeds recording table tennis loop drive sessions by one or more table tennis players. In this simplified embodiment, the body posture data set includes two data points: (i) a maximum angle of rotation value of the player's waist across a first sub-period of time from the period of time, beginning prior to the player hitting the ball with their racket through striking the ball with the racket and ending after the ball and racket are no longer in physical contact; and (ii) a maximum change of angle value of between the player's upper arm and forearm across a second sub-period of time of the period of time beginning with the player striking the ball with the racket and ending after the ball and racket are no longer in physical contact. Also, in this simplified embodiment the ball return quality data set includes two data points: (i) whether the ball scored as a result of the player striking the ball with their racket; and (ii) a rotational speed value corresponding to the topspin of the ball after the ball and racket are no longer in physical contact.

In some alternative embodiments, other data points are included in each historical loop drive instance, such as: (i) for the ball return quality data set: (a) the ball rate of movement after contacting the table—the higher the better, (b) the movement displacement of the ball's return—the longer the better (a longer the displacement means that the ball is nearer to the edge of the table and more difficult to be returned by an opposing player, and (c) the side spin speed of the ball—the lower the better (the higher the side spin speed, means the body/racket postures could be wrong when hitting the loop drive ball; ideally there should be zero side spin during loop drive); and (ii) for the body posture data set: (a) the height of the shoulders from the ground when bending the knees, (b) the angle between thigh and calf when bending the knees, and (c) the racket's movement displacement when waiving the racket prior to hitting the ball, (d) the angle between upper arm and torso when hitting the ball with the racket, (e) the height of the elbow from the table when hitting the ball with the racket, (f) the posture of the racket (height of the racket from the table, angle between racket surface and ball, and position of the ball on the surface of the racket when contact occurs), and (g) the movement speed/acceleration of the racket when hitting the ball with the racket.

In some other alternative embodiments, the historical body posture and ball data set is a labeled data set labeled by one or more machine learning models, including a first machine learning model and a second machine learning model. The first machine learning model labels ball return quality in a plurality of historical loop drive instances based on a plurality of ball return quality metrics. The second machine learning model labels a plurality of player body postures in a plurality of historical loop drive instances. In some alternative embodiments, there are thousands historical loop drive instances included in the historical body posture and ball data set.

Processing proceeds to operation S260, where table tennis training machine learning (ML) building mod 304 builds a table tennis training machine learning (ML) model. In this simplified embodiment, the machine learning model is built using the ten received historical loop drive instances, where the ball return quality data set is used to evaluate and label the body posture data set. Body posture data points that correspond to topspin data points with high rotational speed values and balls that scored as a result of the player striking the ball with their racket are labeled with an optimal posture value, with higher (or better/more optimal) values awarded to body posture data points the higher the rotational speed value of their corresponding topspin rotational speed value.

In some alternative embodiments, the table tennis training ML model is built using some or all of the previously mentioned other data points included in each historical loop drive instance in some alternative embodiments, such as: (i) for the ball return quality data set: (a) the rate of movement of the ball after contacting the table—the higher the better, (b) the movement displacement of the ball's return—the longer the better (a longer the displacement means that the ball is nearer to the edge of the table and more difficult to be returned by an opposing player, and (c) the side spin speed of the ball—the lower the better (the higher the side spin speed, means the body/racket postures could be wrong when hitting the loop drive ball; ideally there should be zero side spin during loop drive); and (ii) for the body posture data set: (a) the height of the shoulders from the ground when bending the knees, (b) the angle between thigh and calf when bending the knees, and (c) the racket's movement displacement when waiving the racket prior to hitting the ball, (d) the angle between upper arm and torso when hitting the ball with the racket, (e) the height of the elbow from the table when hitting the ball with the racket, (f) the posture of the racket (height of the racket from the table, angle between racket surface and ball, and position of the ball on the surface of the racket when contact occurs), and (g) the movement speed/acceleration of the racket when hitting the ball with the racket. In some alternative embodiments, weights are assigned to each body posture data point by the table tennis training ML model and refined using the ball return quality data points to correlate specific body postures to ball return quality metrics (for example, angle of waist turning has a greater impact on overall speed of the loop drive return ball but less impact on the topspin of the loop drive return ball compared to the angle of bending at the elbow of the loop drive player between their upper arm and forearm).

Processing proceeds to operation S265, where live table tennis loop drive datastore mod 306 receives a live table tennis loop drive data set. In this simplified embodiment, the live table tennis loop drive data set includes one live loop drive instance, where each live loop drive instance includes a posture data set and a ball return quality data set from the live loop drive return instance, concerning a period of time (also referred to as the live period of time) beginning from the moment a table tennis ball (also referred to as the live ball) begins travelling towards a table tennis player practicing loop drive (also referred to as the live player), through the live player striking the live ball with their table tennis racket (also referred to as the live racket), until after the live ball contacts a table tennis table (also called the live table) a second time after the live player strikes the live ball with the live racket, or contacts a table tennis racket surface of an opposing table tennis player, or contacts any other surface. These data sets are originated from computer vision technologies applied to video feeds recording table tennis loop drive sessions by the live player, through ball and posture recording client 104 of FIG. 1. In this simplified embodiment, the body posture data set includes two data points: (i) a maximum angle of rotation value of the live player's waist across a first sub-period of time from the live period of time, beginning prior to the live player hitting the live ball with the live racket through striking the live ball with the live racket and ending after the live ball and the live racket are no longer in physical contact; and (ii) a maximum change of angle value of between the live player's upper arm and forearm across a second sub-period of time of the live period of time beginning with the live player striking the live ball with the live racket and ending after the live ball and the live racket are no longer in physical contact. Also, in this simplified embodiment the ball return quality data set for the live loop drive instance includes two data points: (i) whether the live ball scored as a result of the live player striking the live ball with the live racket; and (ii) a rotational speed value corresponding to the topspin of the live ball after the live ball and the live racket are no longer in physical contact.

In some alternative embodiments, the live loop drive instance includes some or all of the following data points: (i) for the ball return quality data set: (a) the rate of movement of the live ball after contacting the table—the higher the better, (b) the movement displacement of the live ball's return—the longer the better (a longer the displacement means that the live ball is nearer to the edge of the live table and more difficult to be returned by an opposing player, and (c) the side spin speed of the live ball—the lower the better (the higher the side spin speed, means the body/racket postures could be wrong when hitting the loop drive ball; ideally there should be zero side spin during loop drive); and (ii) for the body posture data set: (a) the height of the shoulders from the ground when bending the knees, (b) the angle between thigh and calf when bending the knees, and (c) the live racket's movement displacement when waiving the live racket prior to hitting the live ball, (d) the angle between upper arm and torso when hitting the live ball with the live racket, (e) the height of the elbow from the live table when hitting the live ball with the live racket, (f) the posture of the live racket (height of the live racket from the live table, angle between live racket surface and the live ball, and position of the live ball on the surface of the live racket when contact occurs), and (g) the movement speed/acceleration of the live racket when hitting the live ball with the live racket.

Processing proceeds to operation S270, where ML model label assigning mod 308 assigns labels to the live table tennis loop drive data set using the table tennis training ML model. In this simplified embodiment, the table tennis training ML model determines labels the maximum angle of rotation value of the live player's waist across a first sub-period of time from the live period of time, beginning prior to the live player hitting the live ball with the live racket through striking the live ball with the live racket and ending after the live ball and the live racket are no longer in physical contact as an optimal angle for loop drive, assigning an optimal angle label, and the maximum change of angle value of between the live player's upper arm and forearm across a second sub-period of time of the live period of time beginning with the live player striking the live ball with the live racket and ending after the live ball and the live racket are no longer in physical contact as a non-optimal angle for loop drive, assigning a needs adjustment label. Assigning the needs adjustment label is sometimes referred to as flagging the posture for adjustment. The table tennis training ML model and ML model label assigning mod 308 determined the label for the maximum change of angle value of between the live player's upper arm and forearm across the second sub-period of time of the live period of time beginning with the live player striking the live ball with the live racket and ending after the live ball and the live racket are no longer in physical contact using: (i) the maximum change of angle value of between the live player's upper arm and forearm across the second sub-period of time of the live period of time beginning with the live player striking the live ball with the live racket and ending after the live ball and the live racket are no longer in physical contact; and (ii) the rotational speed value corresponding to the topspin of the live ball after the live ball and the live racket are no longer in physical contact.

In some alternative embodiments, determining labels for a given posture data point further uses the following data points: (i) whether the live ball scored as a result of the live player striking the live ball with the live racket; (ii) the rate of movement of the live ball after contacting the table—the higher the better; (iii) the movement displacement of the live ball's return—the longer the better (a longer the displacement means that the live ball is nearer to the edge of the live table and more difficult to be returned by an opposing player; and (iv) the side spin speed of the live ball—the lower the better (the higher the side spin speed, means the body/racket postures could be wrong when hitting the loop drive ball; ideally there should be zero side spin during loop drive). In some alternative embodiments, ML model label assigning mod 308 uses weights assigned to the different body posture data points by the table tennis ML model and the ball return quality data set from the live loop drive return instance to determine which body posture data points correspond to sub-optimal ball return qualities (for example, when a ball return quality indicates a relatively low rotational speed value corresponding to topspin, the maximum change of angle value of between the live player's upper arm and forearm across the second sub-period of time of the live period of time beginning with the live player striking the live ball with the live racket and ending after the live ball and the live racket are no longer in physical contact is weighted as the primary contributor to the rotational speed value corresponding to topspin).

Processing proceeds to operation S275, where posture adjustment value determination mod 310 determines posture adjustment values using the assigned labels and the table tennis training ML model. In this simplified embodiment, posture adjustment value determination mod 310 determines that the optimal maximum change of angle value of between the live player's upper arm and forearm across the second sub-period of time of the live period of time beginning with the live player striking the live ball with the live racket and ending after the live ball and the live racket are no longer in physical contact is 7° greater than the value that is present in the live table tennis loop drive data set. In some alternative embodiments, the determined posture adjustment values correspond to the plurality of body posture data points previously discussed in prior operations of the present process.

Figure 4:
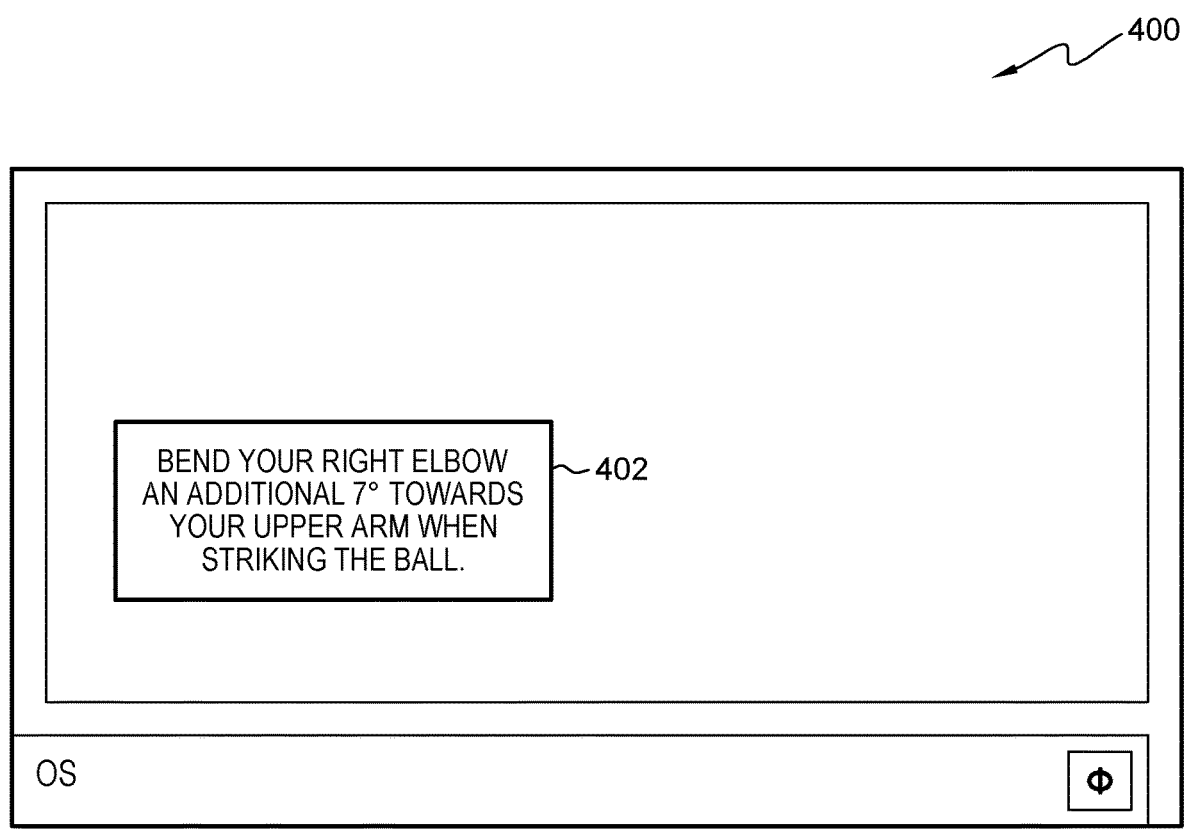
FIG. 4 is a screenshot view generated by the first embodiment system.

Processing proceeds to operation S280, where posture adjustment value output mod 312 outputs the determined posture adjustment values. In this simplified embodiment, window 402 of screenshot 400 of FIG. 4 is displayed on a display of client 106 to the live loop driver player, to guide the live loop drive player on how to optimize their loop drive body postures to improve the ball return qualities of their loop drive return ball. In some alternative embodiments, the posture adjustment value is output as a video showing the video recording used to generate the live table tennis loop drive data set with outlines showing optimal angles of rotation and velocity of motion for the arms, legs, waist, and live racket of the live player superimposed over the images of the live player and the live racket. In some alternative embodiments, the posture adjustment values are outputted audibly by a speaker component of client 106 using text to speech technology.

III. Further Comments and/or Embodiments

Some embodiments of the present invention recognize the following facts, potential problems and/or potential areas for improvement with respect to the current state of the art: (i) loop drive is one of the most key and popular techniques in table-tennis; (ii) it is not easy to master the accurate skills of loop-drive during training/practices, especially for novices; (ii) correct body postures are key to the quality of loop drive; (iii) there are 3 primary problems for table-tennis novices during loop drive training/practices; (iv) first, the body postures (height of the elbow from the table, angle between the upper arm and forearm, height of the racket from the table, etc.) during the training are not standard (standard postures can contribute to higher success rate) and may have problems; (v) continuously practicing with incorrect postures/actions will not only resulting in bad performance when playing table-tennis, but also make it more difficult to rectify in the future; (vi) second, there is not an accurate and quantitative judging system to give out detailed suggestions on the improvements/corrections on the wrong practice actions; (vii) notice that even a coach cannot give detailed and very accurate and measurable points that need to be improved, i.e. how much needs to be adjusted in the angle used when bending the wrist, or how much needs to be adjusted in the angle used between the upper arm and the forearm when hitting the ball; and (viii) there is not a self-adaptive analyzing system for training, which can personalize and customize according to different players' different body characteristics (i.e. body height, body proportion, etc.).

Some embodiments of the present invention may include one, or more, of the following operations, features, characteristics and/or advantages: (i) leverage machine learning methods to collect data related to body postures of the player, the ball's return quality, etc., to build a self-adaptive analyzing system to give out accurate, quantitative and personalized details that can be used for players to correct and improve their body postures and techniques during loop drive training, and finally make the player master the loop drive skills; (ii) a machine-learning based component that focus on analyzing the relationships between body postures and a ball's return qualities, setting up a corresponding analyzing model that can benefit the quality of table-tennis loop drive training; (iii) a comprehensive and synthetic set of data points related to body postures (related to arms, waist, legs, etc.) and ball's return quality (top/down rotation speed, side spin speed, etc. —high side spin is not a good sign of a good loop drive); (iv) a relatively big set of data points related to body postures (related to arms, waist, legs, etc.) and ball's return quality (i.e. High side spin speed is not a good sign of a good loop drive); and (v) the analyzing component can output accurate, quantitative and personalized details that instruct the player how to correct their body postures during the loop-drive training, especially for novices.

Some embodiments of the present invention may include one, or more, of the following operations, features, characteristics and/or advantages: (i) a first step includes choosing a video-based 3-D modeling (i.e. computer vision) technique as well as a video acquisition and processing technique; (ii) modeling the analyzing component based on: body postures data and ball's return quality metrics data; (iii) leverage computer vision, video acquisition & processing methods to get detailed body postures data of a training player and the corresponding return quality metrics data for the ball each hit by the player; (iv) based on the ball's return quality data, perform labeling and classification; (v) assign initial weights for each feature that contributes to ball's return quality; (vi) based on some feature (i.e. whether the ball scores or not), leverage a specific machine learning (ML) algorithm to automatically adjust the weight and make it optimal; (vii) based on the calculated/adjusted weight for each feature, determine the overall quantitative evaluation of the ball's return quality; (viii) define a threshold, where values higher than the threshold are labeled as "high" quality for the return ball; (ix) otherwise labeled as "low" quality; and (x) choose corresponding ML algorithms, based on the labeling result from the previous step, and the ML algorithms keep in a self-adaptive mode to recommend better body postures that can contribute to better ball's return quality during loop drive training.

Some embodiments of the present invention may include one, or more, of the following operations, features, characteristics and/or advantages: (i) using different parameters to label the ball return quality such as: (a) top spin speed, (b) side spin speed, (c) whether the ball return is on-table or not, and (d) the ball rate of movement after contacting the table; (ii) the labeling result works as an input for the analyzing component to recommend better body postures; (iii) calculating and analyzing players' body postures data (i.e. the degree of angle of turning waist, the height of the shoulders from the ground when bending the knees, the height of the elbow from the table, the degree of angle between upper arm and forearm, etc.) and ball's return quality data (i.e. topspin/backspin speed, the side spin speed of the ball, the movement displacement of the ball's return, etc.) during table-tennis loop-drive training to build a self-adaptive analyzing system to analyze the relationships between body postures and the ball's return qualities; (iv) finally give out accurate, quantitative and personalized details that can be used for players to correct and improve their body postures (i.e., how many degree of angles of turning waist need to be adjusted, etc.) in order to improve the ball's return quality and make the player master the loop drive skills; (v) focus on analyzing a relatively big set of data points related to body postures and ball's return quality during table-tennis loop drive; (vi) these data points work as input for a mature machine learning model which can analyze the relationship between body postures and ball's return qualities; (vii) recommend a quantitative correction of player's body postures to make the player master the loop drive skills quickly and accurately; (viii) leverage existing computer vision, video capturing/processing and other related mature technologies to calculate and obtain the data related to ball's return quality; (ix) build a machine learning (ML) model to analyze the relationship between body postures and ball's return qualities; and (x) use that ML model to recommend a quantitative correction of player's body postures to make the player master the loop drive skills quickly and accurately.

Some embodiments of the present invention may include one, or more, of the following operations, features, characteristics and/or advantages: (i) one focus of an embodiment of the present invention is feature data definition and quantification; (ii) for example, the quantitative definition of body postures includes: (a) the degree of angle of turning waist, (b) the height of the shoulders from the ground when bending the knees, (c) the height of the elbow from the table, (d) the degree of angle between upper arm and forearm, etc.; (iii) the quantitative definition of the ball's return qualities includes: (a) topspin/backspin speed, (b) the side spin speed of the ball, (c) the movement displacement of the ball's return, etc.; (iv) another important focus and novelty of an embodiment of the present invention is that inputting the data captured and quantified into a machine learning model to create a self-adaptive analyzing system to analyze the relationship between body postures and ball's return qualities; (v) and recommending a quantitative correction of player's body postures to guide the player to master the loop drive skills quickly and accurately; (vi) leverage existing mature video capturing and processing methods as well as 3D modeling methods to calculate and obtain those data points on body postures and ball's return quality; (vii) which are inputs for the machine learning model that can analyze the relationships between body postures and ball's return qualities during table-tennis loop drive training; (viii) novelty includes the feature data's definition and quantification; and (ix) another important novelty is that the machine learning model and the self-adaptive analyzing system are applied to analyze the relationship between body postures and ball's return qualities and finally recommend a quantitative correction of player's body postures to make the player master the loop drive skills quickly and accurately.

Some embodiments of the present invention may include one, or more, of the following operations, features, characteristics and/or advantages: (i) focus on building a self-adaptive analyzing system to analyze the relationships between body postures and ball's return qualities during table-tennis loop drive training by leveraging a series of existing mature machine learning, video acquisition and processing technologies to collect, quantify and calculate the data related to body postures and calculate the ball's overall return quality; (ii) this analyzing system finally recommends quantitative corrections of a player's body postures to make the player master the loop drive skills quickly and accurately; (iii) loop drive ball's return quality and corresponding evaluation criteria includes: (a) top (or down) rotation speed of the ball—the higher the better, (b) the ball rate of movement after contacting the table—the higher the better, (c) the movement displacement of the ball's return—the longer the better (a longer the displacement means that the ball is nearer to the edge of the table and more difficult to be returned by an opposing player, (d) the side spin speed of the ball—the lower the better (the higher the side spin speed, means the body/racket postures could be wrong when hitting the loop drive ball; ideally there should be zero side spin during loop drive), and (e) the ball return scores (or does not)—scoring indicates that the quality was good, and whether the ball return scores can also be used to automatically adjust the weight for the previously listed factors when calculating the overall ball's return quality; (iv) a list of a player's body postures during the process of waving the racket and before beating loop used in the analysis includes: (a) the angle of turning of their waist, (b) the height of the shoulders from the ground when bending the knees, (c) the angle between thigh and calf when bending the knees, and (d) the racket's movement displacement when waiving the racket prior to hitting the ball; and (v) a list of a player's body postures during the process of hitting the loop drive ball used in the analysis includes: (a) the angle between upper arm and forearm, (b) the angle between upper arm and armpit, (c) the height of the elbow from the table, (d) the posture of the racket (height of the racket from the table, angle between racket surface and ball, and position of the ball on the surface of the racket when contact occurs), and (e) the movement speed/acceleration of the racket.

Figure 5:
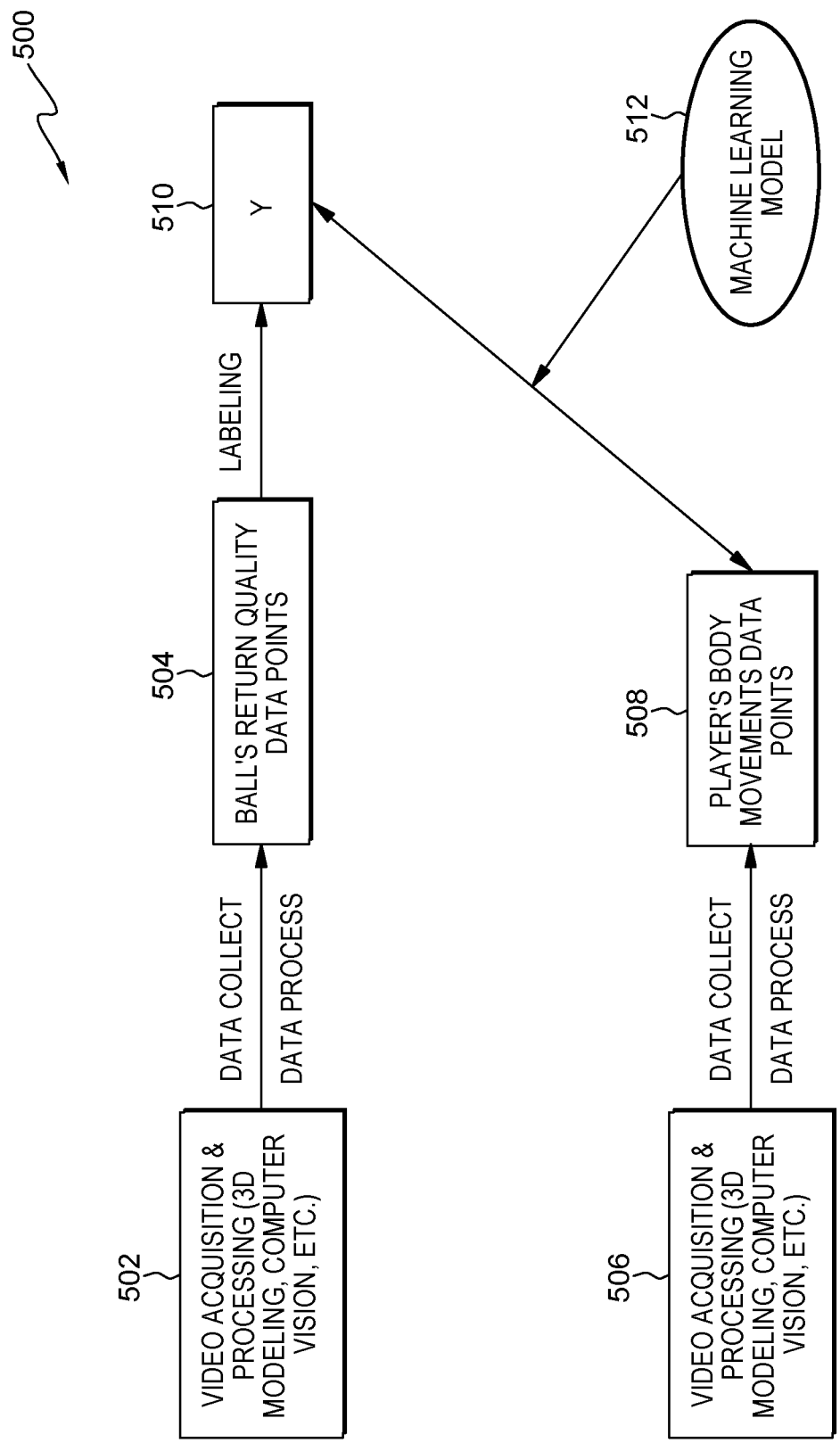
FIG. 5 is a flowchart diagram showing a second embodiment method.

According to some embodiments of the present invention, there is a method shown in flowchart 500 of FIG. 5 including the following operations: (i) flowchart block 502; (ii) flowchart block 504; (iii) flowchart block 506; (iv) flowchart block 508; (v) flowchart block 510; and (vi) flowchart block 512.

According to some embodiments of the present invention, there is a method, computer program product and/or system for a table tennis loop drive training, analyzing and judging system that performs the following operations: (i) leveraging machine learning methods, including video-based 3-D modeling and video acquisition and processing, to collect data related to body postures of the player and the ball's return; and (ii) building a self-adaptive analyzing system to provide accurate, quantitative and personalized details that can be used by players to correct and improve their body posture during loop drive training. In these embodiments the body posture data includes the angle of turning of the player's wrist and the angle between the player's upper arm and forearm. Also, in these embodiments the ball return data includes the rotation speed of the ball and the displacement of the ball's return.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

What is claimed is:

1. A computer-implemented method (CIM) comprising:
   receiving a plurality of historical loop drive session data sets, where a loop drive session data set includes at least a player posture data set and a corresponding ball return quality data set, where a given player posture data set includes a plurality of posture data points, and a given ball return quality data set includes a plurality of ball return quality metrics;

generating a table tennis training machine learning model based, at least in part, on the plurality of loop drive session data sets;

receiving a live loop drive session data set corresponding to a loop drive session of a live table tennis player; and assigning labels to the plurality of posture data points of the player posture data set of the live loop drive session data set based, at least in part, on the table tennis training machine learning model and a ball return quality data set of the live loop drive session data set.

2. The CIM of claim 1, further comprising:
flagging at least one posture data point of the plurality of posture data points of the player posture data set of the live loop drive session data set for posture adjustment based, at least in part, on the assigned label corresponding to the at least one posture data point.

3. The CIM of claim 2, further comprising:
determining a quantitative posture adjustment value for the flagged at least one posture data point based, at least in part, on the table tennis training machine learning model and the ball return quality data set of the live loop drive session data set.

4. The CIM of claim 3, further comprising:
outputting the determined quantitative posture adjustment value to the live table tennis player.

5. The CIM of claim 4, wherein:
the outputted determined quantitative posture adjustment value is outputted audibly using text-to-speech techniques through a speaker device; and
the outputted determined quantitative posture adjustment value is outputted visually on an electronic display device.

6. The CIM of claim 1, wherein:
the plurality of posture data points includes two data subsets corresponding to: (i) a pre-contact posture data set corresponding to table tennis player posture data points prior to striking a table tennis ball with a table tennis racket, and (ii) a contact posture data set corresponding to table tennis player posture data points at or after striking the table tennis ball with the table tennis racket;
the pre-contact posture data set includes: (i) an angle value corresponding to a direction and degree of turning in a waist of a table tennis player, (ii) a height distance value corresponding to a distance between shoulders of the table tennis player and a floor surface the table tennis player is standing on, (iii) an angle value corresponding to a direction and degree of bending at knees of the table tennis player between their upper and lower legs, and (iv) a velocity value corresponding to a table tennis racket speed;
the contact posture data set includes: (i) an angle value corresponding to a direction and degree of bending at an elbow of the table tennis player in an arm holding the table tennis racket, (ii) an angle value corresponding to a direction and degree of bending at a shoulder of the table tennis player between their upper arm of the arm holding the table tennis racket and their torso, (iii) a height distance value corresponding to height of an elbow of the arm of the table tennis player holding the table tennis racket from a table tennis table, (iv) a set of racket posture values corresponding to height of the table tennis racket from the table tennis table, degree and direction of an angle between a striking surface of the table tennis racket and the table tennis ball, and position of the table tennis ball on the table tennis racket striking surface when striking occurs between the table tennis racket and table tennis ball, and (v) velocity and acceleration values for the table tennis racket when striking occurs and through a follow-through motion; and
the plurality of ball return quality metrics includes: (i) a top/downspin rotation speed value of the table tennis ball after striking occurs, (ii) a ball velocity value after contacting the table tennis table after striking occurs, (iii) a side spin rotation speed value of the table tennis ball after striking occurs, (iv) a score value corresponding to whether the table tennis scored from striking the table tennis ball.

7. A computer program product (CPP) comprising:
a machine readable storage device; and
computer code stored on the machine readable storage device, with the computer code including instructions for causing a processor(s) set to perform operations including the following:
receiving a plurality of historical loop drive session data sets, where a loop drive session data set includes at least a player posture data set and a corresponding ball return quality data set, a given player posture data set includes a plurality of posture data points, and a given ball return quality data set includes a plurality of ball return quality metrics,
generating a table tennis training machine learning model based, at least in part, on the plurality of loop drive session data sets,
receiving a live loop drive session data set corresponding to a loop drive session of a live table tennis player, and
assigning labels to the plurality of posture data points of the player posture data set of the live loop drive session data set based, at least in part, on the table tennis training machine learning model and a ball return quality data set of the live loop drive session data set.

8. The CPP of claim 7, wherein the computer code further includes instructions for causing the processor(s) set to perform the following operations:
flagging at least one posture data point of the plurality of posture data points of the player posture data set of the live loop drive session data set for posture adjustment based, at least in part, on the assigned label corresponding to the at least one posture data point.

9. The CPP of claim 8, wherein the computer code further includes instructions for causing the processor(s) set to perform the following operations:
determining a quantitative posture adjustment value for the flagged at least one posture data point based, at least in part, on the table tennis training machine learning model and the ball return quality data set of the live loop drive session data set.

10. The CPP of claim 9, wherein the computer code further includes instructions for causing the processor(s) set to perform the following operations:
outputting the determined quantitative posture adjustment value to the live table tennis player.

11. The CPP of claim 10, wherein:
the outputted determined quantitative posture adjustment value is outputted audibly using text-to-speech techniques through a speaker device; and the outputted determined quantitative posture adjustment value is outputted visually on an electronic display device.

12. The CPP of claim 7, wherein:
the plurality of posture data points includes two data subsets corresponding to: (i) a pre-contact posture data set corresponding to table tennis player posture data points prior to striking a table tennis ball with a table tennis racket, and (ii) a contact posture data set corresponding to table tennis player posture data points at or after striking the table tennis ball with the table tennis racket;
the pre-contact posture data set includes: (i) an angle value corresponding to a direction and degree of turning in a waist of a table tennis player, (ii) a height distance value corresponding to a distance between shoulders of the table tennis player and a floor surface the table tennis player is standing on, (iii) an angle value corresponding to a direction and degree of bending at knees of the table tennis player between their upper and lower legs, and (iv) a velocity value corresponding to a table tennis racket speed;
the contact posture data set includes: (i) an angle value corresponding to a direction and degree of bending at an elbow of the table tennis player in an arm holding the table tennis racket, (ii) an angle value corresponding to a direction and degree of bending at a shoulder of the table tennis player between their upper arm of the arm holding the table tennis racket and their torso, (iii) a height distance value corresponding to height of an elbow of the arm of the table tennis player holding the table tennis racket from a table tennis table, (iv) a set of racket posture values corresponding to height of the table tennis racket from the table tennis table, degree and direction of an angle between a striking surface of the table tennis racket and the table tennis ball, and position of the table tennis ball on the table tennis racket striking surface when striking occurs between the table tennis racket and table tennis ball, and (v) velocity and acceleration values for the table tennis racket when striking occurs and through a follow-through motion; and
the plurality of ball return quality metrics includes: (i) a top/downspin rotation speed value of the table tennis ball after striking occurs, (ii) a ball velocity value after contacting the table tennis table after striking occurs, (iii) a side spin rotation speed value of the table tennis ball after striking occurs, (iv) a score value corresponding to whether the table tennis scored from striking the table tennis ball.

13. A computer system (CS) comprising:
a processor(s) set;
a machine readable storage device; and
computer code stored on the machine readable storage device, with the computer code including instructions for causing the processor(s) set to perform operations including the following:
  receiving a plurality of historical loop drive session data sets, where a loop drive session data set includes at least a player posture data set and a corresponding ball return quality data set, a given player posture data set includes a plurality of posture data points, and a given ball return quality data set includes a plurality of ball return quality metrics,
  generating a table tennis training machine learning model based, at least in part, on the plurality of loop drive session data sets,
  receiving a live loop drive session data set corresponding to a loop drive session of a live table tennis player, and
  assigning labels to the plurality of posture data points of the player posture data set of the live loop drive session data set based, at least in part, on the table tennis training machine learning model and a ball return quality data set of the live loop drive session data set.

14. The CS of claim 13, wherein the computer code further includes instructions for causing the processor(s) set to perform the following operations:
flagging at least one posture data point of the plurality of posture data points of the player posture data set of the live loop drive session data set for posture adjustment based, at least in part, on the assigned label corresponding to the at least one posture data point.

15. The CS of claim 14, wherein the computer code further includes instructions for causing the processor(s) set to perform the following operations:
determining a quantitative posture adjustment value for the flagged at least one posture data point based, at least in part, on the table tennis training machine learning model and the ball return quality data set of the live loop drive session data set.

16. The CS of claim 15, wherein the computer code further includes instructions for causing the processor(s) set to perform the following operations:
outputting the determined quantitative posture adjustment value to the live table tennis player.

17. The CS of claim 16, wherein:
the outputted determined quantitative posture adjustment value is outputted audibly using text-to-speech techniques through a speaker device; and
the outputted determined quantitative posture adjustment value is outputted visually on an electronic display device.

18. The CS of claim 13, wherein:
the plurality of posture data points includes two data subsets corresponding to: (i) a pre-contact posture data set corresponding to table tennis player posture data points prior to striking a table tennis ball with a table tennis racket, and (ii) a contact posture data set corresponding to table tennis player posture data points at or after striking the table tennis ball with the table tennis racket;
the pre-contact posture data set includes: (i) an angle value corresponding to a direction and degree of turning in a waist of a table tennis player, (ii) a height distance value corresponding to a distance between shoulders of the table tennis player and a floor surface the table tennis player is standing on, (iii) an angle value corresponding to a direction and degree of bending at knees of the table tennis player between their upper and lower legs, and (iv) a velocity value corresponding to a table tennis racket speed;
the contact posture data set includes: (i) an angle value corresponding to a direction and degree of bending at an elbow of the table tennis player in an arm holding the table tennis racket, (ii) an angle value corresponding to a direction and degree of bending at a shoulder of the table tennis player between their upper arm of the arm holding the table tennis racket and their torso, (iii) a height distance value corresponding to height of an elbow of the arm of the table tennis player holding the table tennis racket from a table tennis table, (iv) a set of racket posture values corresponding to height of the table tennis racket from the table tennis table, degree and direction of an angle between a striking surface of the table tennis racket and the table tennis ball, and position of the table tennis ball on the table tennis racket striking surface when striking occurs between the table tennis racket and table tennis ball, and (v) velocity and acceleration values for the table tennis racket when striking occurs and through a follow-through motion; and the plurality of ball return quality metrics includes: (i) a top/downspin rotation speed value of the table tennis ball after striking occurs, (ii) a ball velocity value after contacting the table tennis table after striking occurs, (iii) a side spin rotation speed value of the table tennis ball after striking occurs, (iv) a score value corresponding to whether the table tennis scored from striking the table tennis ball.

\* \* \* \* \*